US010234900B2

(12) United States Patent
Lee et al.

(10) Patent No.: US 10,234,900 B2
(45) Date of Patent: Mar. 19, 2019

(54) PROXY BASED COMMUNICATION SCHEME IN DOCKING STRUCTURE

(71) Applicant: Samsung Electronics Co., Ltd., Gyeonggi-do (KR)

(72) Inventors: Jong-Hyo Lee, Gyeonggi-do (KR); Karthik Srinivasa Gopalan, Bangalore (IN); Kiran Bharadwaj Vedula, Bangalore (IN); Jun-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 681 days.

(21) Appl. No.: 14/286,167

(22) Filed: May 23, 2014

(65) Prior Publication Data
US 2014/0351477 A1 Nov. 27, 2014

Related U.S. Application Data

(60) Provisional application No. 61/826,710, filed on May 23, 2013, provisional application No. 61/878,403, (Continued)

(51) Int. Cl.
*G06F 1/00* (2006.01)
*G06F 1/16* (2006.01)
(Continued)

(52) U.S. Cl.
CPC ........ *G06F 1/1632* (2013.01); *H04L 61/2528* (2013.01); *H04W 8/005* (2013.01); *H04W 76/12* (2018.02)

(58) Field of Classification Search
CPC ........ G06F 1/632; G06F 13/00; H04W 4/008; H04W 76/02
See application file for complete search history.

(56) References Cited

U.S. PATENT DOCUMENTS 7,076,270 B2 * 7/2006 Jaggers ............. H04M 1/72527
379/428.03
8,254,992 B1   8/2012 Ashenbrenner et al.
(Continued)

FOREIGN PATENT DOCUMENTS

CN      101039514      9/2007
CN      101466022      6/2009
(Continued)

OTHER PUBLICATIONS

The Group A listed items were cited by the Korean Patent Office in a counterpart application, namely Appln. No. PCT/KR2014/004616. The International Search Report dated Sep. 1, 2014.
(Continued)

*Primary Examiner* — Henry Tsai
*Assistant Examiner* — Christopher A Daley
(74) *Attorney, Agent, or Firm* — The Farrell Law Firm, P.C.

(57) ABSTRACT

Methods and apparatuses are provided for supporting data transmission by a wireless docking center. A first single hop communication link is established with a peripheral device configured to receive content data. A second single hop communication link is established with a dockee device configured to transmit the content data. At least one of a message and the content data is transferred from the second communication link to the first communication link.

24 Claims, 9 Drawing Sheets

Related U.S. Application Data filed on Sep. 16, 2013, provisional application No. 61/915,749, filed on Dec. 13, 2013.

(51) Int. Cl.
*H04L 29/12* (2006.01)
*H04W 8/00* (2009.01)
*H04W 76/12* (2018.01)

(56) References Cited

U.S. PATENT DOCUMENTS

| | | | |
|---|---|---|---|
| 8,462,734 B2* | 6/2013 | Laine | H04M 1/7253 370/252 |
| 9,330,047 B2* | 5/2016 | Huang | G06F 13/00 |
| 2003/0158917 A1* | 8/2003 | Andrew | H04L 67/04 709/220 |
| 2003/0196084 A1* | 10/2003 | Okereke | H04L 63/0281 713/156 |
| 2005/0002402 A1* | 1/2005 | Fairman | H04L 65/608 370/395.5 |
| 2007/0162753 A1 | 7/2007 | Nakano et al. | |
| 2010/0057969 A1* | 3/2010 | Meiri | G06F 1/1632 710/303 |
| 2011/0185026 A1 | 7/2011 | Kambhatla | |
| 2011/0188391 A1* | 8/2011 | Sella | H04W 24/10 370/252 |
| 2012/0155445 A1 | 6/2012 | Javaregowda et al. | |
| 2012/0265913 A1 | 10/2012 | Suumaki et al. | |
| 2013/0311694 A1* | 11/2013 | Bhamidipati | H04M 1/7253 710/303 |
| 2014/0120829 A1* | 5/2014 | Bhamidipati | H04N 21/42207 455/3.06 |
| 2014/0207902 A1* | 7/2014 | Joshi | G06F 9/4401 709/217 |
| 2015/0016417 A1* | 1/2015 | Dees | G06F 1/1698 370/331 |
| 2015/0056920 A1* | 2/2015 | Huttunen | H04B 7/26 455/41.2 |
| 2015/0100715 A1* | 4/2015 | Huang | G06F 13/4081 710/303 |
| 2015/0172757 A1* | 6/2015 | Kafle | H04L 67/1044 725/81 |

FOREIGN PATENT DOCUMENTS

| | | |
|---|---|---|
| CN | 101645857 | 2/2010 |
| JP | 2007-272862 | 10/2007 |
| WO | WO 2012/169830 | 12/2012 |
| WO | WO 2013/038359 | 3/2013 |
| WO | WO 2013/177001 | 11/2013 |

OTHER PUBLICATIONS

The Group B listed items were cited by the European Patent Office in a counterpart application, namely Appln. No. 14169613.8-1870.
The European Search Report dated Oct. 16, 2014.
Chinese Office Action dated Oct. 20, 2017 issued in counterpart application No. 201480029619.3, 19 pages.
Chinese Office Action dated May 17, 2018 issued in counterpart application No. 201480029619.3, 22 pages.

* cited by examiner

PROXY BASED COMMUNICATION SCHEME IN DOCKING STRUCTURE

PRIORITY

This application claims priority under 35 U.S.C. § 119(e) to U.S. Provisional Patent Application Ser. Nos. 61/826,710, 61/878,403, and 61/915,749, which were filed in the United States Patent and Trademark Office on May 23, 2013, Sep. 16, 2013, and Dec. 13, 2013, the contents of which are incorporated herein by reference.

BACKGROUND OF THE INVENTION

1. Field of the Invention

The present invention relates generally to terminal discovery, and more particularly, to a method and an apparatus for discovering a terminal and a service by using a proxy and performing communication in a docking environment.

2. Description of the Related Art

A notebook computer (also referred to as a "dockee") may be docked with a docking center to improve user experience by connecting peripheral devices, such as, for example, a mouse, a keyboard, and a display device, to the notebook. Further, additional ports, such as a Universal Serial Bus (USB), may be provided to the docking center. In high-speed home networking technologies such as, for example, WiMedia and Wi-Fi, docking can be wirelessly implemented and a dockee and a docking center can wirelessly communicate with each other.

A Wi-Fi docking standard defines a mechanism that provides docking to various wired and wireless peripheral devices. The Wi-Fi docking mechanism can be performed in a Wi-Fi Peer to Peer (P2P) protocol and also in a basic mode for operations. A Wi-Fi docking architecture defines three roles. A first role corresponds to a Wireless Dockee (WD) device (also referred to as a "dockee device" or a "dockee"). A second role corresponds to a Wireless Docking Center (WDC), which acts as a dock for peripheral devices and makes the docking possible. A third role corresponds to a peripheral device providing a particular service to a dockee. All peripheral devices may be grouped into one Wireless Docking Network (WDN). Further, the peripheral devices may have a plurality of WDNs in one Wi-Fi P2P group.

The Wi-Fi P2P group may include a Group Owner (GO) similar to an Access Point (AP), and a Group Client (GC) similar to a STAtion (STA) device in a Wi-Fi based mode. The GO may transmit a beacon signal in a particular operation channel, and the GC may be discovered by a client device. When the GO is discovered, the GC may start a group join procedure to participate in the group.

The GO may provide a secret key to the GC as a part of the group join procedure. The secret key may be used for secure communication within the group. A Wi-Fi Direct standard forces the use of a Wi-Fi Protected Access (WPA) 2 personal mode for communication security between devices in a P2P group. WPA 2 defines two types of keys which correspond to a Pairwise Transient Key (PTK) used for specific unicast transmission to a pair of the GO and the GC, and a Group Transient Key (GTK) used for multicast and broadcast communication in a P2P group.

A Wi-Fi display standard defines a mirroring mechanism between a source device and a sink device. The source device captures, encodes, and packetizes content to be reproduced, and streams the content to the sink device. The sink device separates and decodes the packet, and displays the content on the sink device or a display (device) connected to the sink device. Before the performance of such operations, the source device and the sink device may discover each other, connect to each other using a Wi-Fi P2P, and recognize capability of each other through a capability negotiation.

A docking scenario of a dockee connected to a peripheral device which serves as a sink device through a physical WDC essentially corresponds to 2 hops. Wi-Fi docking is required to support a Wi-Fi display. A Wi-Fi display standard (for example, Miracast) supports a protocol having a 1 hop from an end entity (Miracast source) to the other end entity (Miracast sink) of a link.

SUMMARY OF THE INVENTION

The present invention has been made to address at least the above problems and/or disadvantages and to provide at least the advantages described below. Accordingly, an aspect of the present invention provides a scheme for operating the Wi-Fi display standard supporting the 1 hop protocol in a docking scenario of the 2 hop topology.

Another aspect of the present invention provides a scheme for meeting requirements of a service sensitive to a delay as the source device directly transmits service data to the sink device in the docking scenario.

An additional aspect of the present invention provides a communication method of a docking system which includes a proxy source, that includes an operation of changing an IP address of a proxy sink to an IP address of a Miracast sink.

In accordance with an aspect of the present invention, a method is provided for supporting data transmission by a wireless docking center. A first single hop communication link is established with a peripheral device configured to receive content data. A second single hop communication link is established with a dockee device configured to transmit the content data. At least one of a message and the content data is transferred from the second communication link to the first communication link.

In accordance with another aspect of the present invention, a method is provided for transmitting data by a dockee device configured to transmit content data and dock to a wireless docking center. A first single hop communication link is established with a wireless docking center having established a second single hop communication link with a peripheral device configured to receive the content data. A message or the content data is transmitted to the wireless docking center through the first communication link.

In accordance with another aspect of the present invention, a wireless docking center device supporting data transmission is provided. The wireless docking center device includes a proxy source module configured to establish a first single hop communication link with a peripheral device configured to receive content data. The wireless docking center device also includes a proxy sink module configured to establish a second single hop communication link with a dockee device configured to transmit the content data. The wireless docking center device further includes a controller configured to transfer at least one of a message and the content data from the second communication link to the first communication link.

In accordance with an additional aspect of the present invention, a dockee device configured to transmit content data and dock to a wireless docking center is provided. The dockee device includes a controller configured to establish a first single hop communication link with a wireless docking center having established a second single hop communication link with a peripheral device configured to receive the content data. The dockee device also includes a transceiver configured to transmit a message or the content data to the wireless docking center through the first communication link.

In accordance with another aspect of the present invention, a method is provided for receiving data by a peripheral device configured to receive content data and dock to a wireless docking center. A first single hop communication link is established with a wireless docking center having established a second single hop communication link with a dockee device configured to transmit the content data. A message or the content data is received from the wireless docking center through the first communication link.

In accordance with an additional aspect of the present invention, a peripheral device configured to receive content data and dock to a wireless docking center is provided. The peripheral device includes a controller configured to establish a first single hop communication link with a wireless docking center having established a second single hop communication link with a dockee device configured to transmit the content data. The peripheral device also includes a transceiver configured to receive a message or the content data from the wireless docking center through the first communication link.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
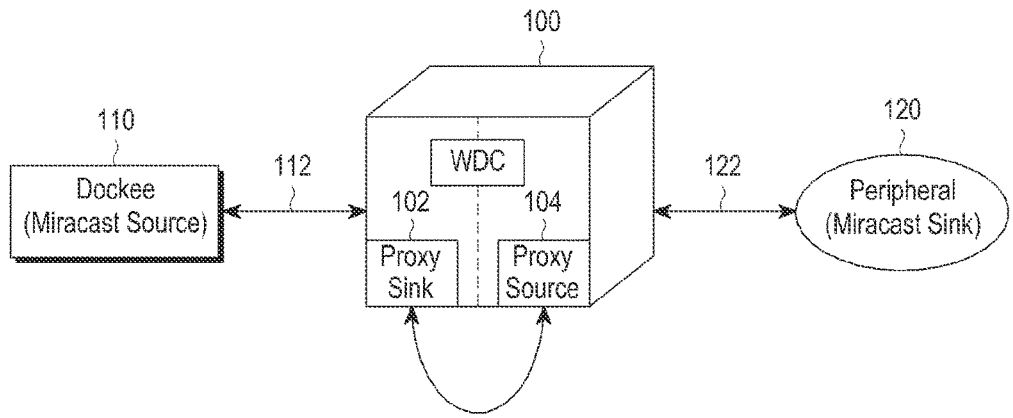
FIG. 1 is a diagram illustrating a topology of a docking network, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms described herein are defined in consideration of the functions of the present invention, but may vary according to the intention or convention of a user or operator. Therefore, the definitions of the terms should be determined based on the contents herein. However, the terms are not limited to the interpretable meanings set forth below.

Although embodiments of the present invention describe a predetermined 2 hop protocol emulating for a 1 hop protocol, a Wi-Fi display protocol will be described as an example in most embodiments of the present invention set forth below. However, embodiments of the present invention can also be similarly applied to a Wi-Fi Serial Bus (WSB) protocol in which USB details can be proxied as Wi-Fi P2P discovery data.

Although embodiments of the present disclosure describe a Miracast technology as an example of a Wi-Fi display, the Miracast technology may be applied to other Wi-Fi display technology standards.

Abbreviations and descriptions used in the present disclosure are summarized in Table 1 below.

TABLE 1

| Abbreviation | Description |
| --- | --- |
| DD | Device Discovery |
| SD | Service Discovery |
| MAC | Medium Access Control: medium access control sub layer |
| GTK | Group Transient Key |
| IP | Internet Protocol |
| WD | Wireless Dockee |
| P2P | Peer to Peer |
| PTK | Pairwise Transient Key |
| RTSP | Real Time Streaming Protocol |
| RTP | Real Time Protocol |
| TCP | Transmission Control Protocol |
| WDC | Wireless Docking Center |
| WDN | Wireless Docking Network or Wireless Docking Environment |
| Wi-Fi | Wireless Fidelity: Wi-Fi |
| WFD | Wi-Fi Display |
| Wi-Fi Direct | P2P connectivity mechanism between Wi-Fi Devices |
| WPA2 | Wireless Protected Access 2 |
| WSB | Wi-Fi Serial Bus |
| WTK | Wireless Transient Key |
| UDP | User Datagram Protocol |

A series of procedures, which can be performed between the source device and the sink device for the Wi-Fi display are described below.

1) Device Discovery (DD)
2) Service Discovery (SD)
3) WFD connectivity setup (P2P)

4) TCP connection
5) WFD capability negotiation
6) WFD session establishment
7) User Input Back Channel (UIBC) setup (selectively)
8) WFD session teardown An example of the Wi-Fi display may include a Miracast technology. The source device may be a device providing content and the sink device may be a device consuming the content. According to an embodiment of the present invention, the eight steps set forth above use the 2 hop topology in a proxy mode using a WDC device.

FIG. 1 is a diagram illustrating a topology of a docking network, according to an embodiment of the present invention.

The docking network includes a WDC 100 serving as a group owner, a dockee 110, and a Miracast sink 120.

According to an embodiment of the present invention, a proxy-based solution is implemented by using the WDC 100, that is, a proxy device. That is, the WDC 100 may handle a 2-hop topology as two single-hop topologies by applying the proxy-based solution. The two single-hop topologies correspond to two Miracast sessions. One of the sessions is a session 112 between the dockee 110, that is, a Miracast source, and a proxy Miracast sink (proxy sink) 102 on the WDC 100. The other session is a session 122 between a proxy Miracast source (proxy source) 104 on the WDC 100 and a peripheral device, that is, the actual Miracast sink 120. The WDC 100 may transfer any message or data from one session to other session.

In an embodiment of the present invention, the dockee 110 is a device docked to the WDC 100, and particularly, a device operating as a source device. The dockee 110 is a device that can provide content to a peripheral device, and may include terminal devices, such as, for example, a smart phone, a smart pad, a tablet, and the like.

Further, the peripheral device 120 is a device establishing a P2P connection with the WDC 100, and particularly, a device operating as a sink device. The peripheral device 120 may display a display unit and display content data transmitted from the source device through the display unit.

Further, the proxy sink 102 and the proxy source 104 are proxy modules implemented on the WDC 100 to emulate the 2-hop topology as two 1-hop topologies. That is, the proxy sink is implemented on the proxy device (WDC) and is a proxy sink module playing a sink role, which is a counterpart of the dockee. The proxy source is implemented on the proxy device (WDC) and is a proxy source module playing a source role, which is a counterpart of the peripheral device.

Figure 2:
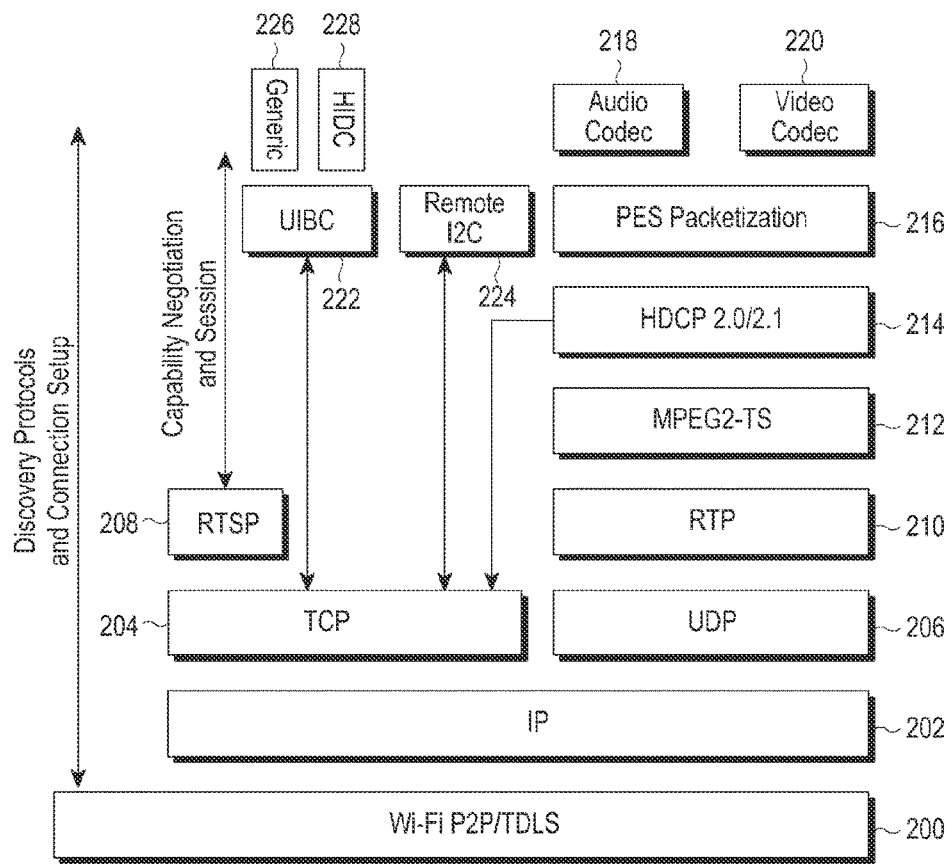
FIG. 2 is a diagram illustrating a protocol stack of a Wi-Fi display.

FIG. 2 is a diagram illustrating a protocol stack of the Wi-Fi display.

A device supporting the Wi-Fi display may include all or some of a plurality of protocols set forth below. That is, the Wi-Fi display device may include at least one of a Wi-Fi P2P/Tunneled Direct Link Setup (TDLS) protocol 200, an Internet Protocol (IP) 202, a Transmission Control Protocol (TCP) 204, a User Datagram Protocol (UDP) 206, a Real-Time Streaming Protocol (RTSP) 208, a Real-Time Protocol (RTP) 210, a Moving Picture Experts Group 2 Transport Stream (MPEG2-TS) protocol 212, a High-bandwidth Digital Content Protection (HDCP) 2.0/2.1 protocol 214, a User Input Back Channel (UIBC) protocol 222, a remote I2C (two-line bidirectional)-bus protocol 224, a Packetized Elementary Stream (PES) packetizing protocol 216, an audio codec 218, and a video codec 220.

Content data may be encoded/decoded according to the PES packetizing protocol 216 by using the MPEG2-TS protocol 212 to support the audio codec 218 or the video codec 220 supported by the Wi-Fi display device. In order to selectively protect content, the HDCP 2.0/2.1 protocol 214 may be applied. Further, the content data may be encapsulated/decapsulated according to the RTP 210, the UDP 206, the IP 202, and the like. The Wi-Fi P2P/TDLS protocol 200 may be used for setting or discovering a connection between devices. The RTSP 208 may be used for a capability negotiation and a session establishment between devices. The UIBC 222, which is a protocol processing a user input, may also be implemented selectively and may include a Human Interface Device Class (HIDC) type 228 and a generic type 226.

Two methods of implementing the proxy solution with the sink device are set forth below.

In a first method, the WFD session establishment between the proxy source and the Miracast sink is held after step 3 of the procedure between the source device and the sink device. In a second method, the WFD session establishment between the proxy source and the sink device is completed before a predetermined Miracast source is docked to the WDC. The first method may include a step in which the sink device is discovered by the proxy source and the WDC participates in a P2P group corresponding to a group owner as a group client, and a step in which the proxy source holds the WFD session establishment until the source device is docked to the WDC.

An embodiment of the present invention is described in which the WFD session establishment between the sink device and the WDC is held until docking of the dockee is completed.

Figure 3:
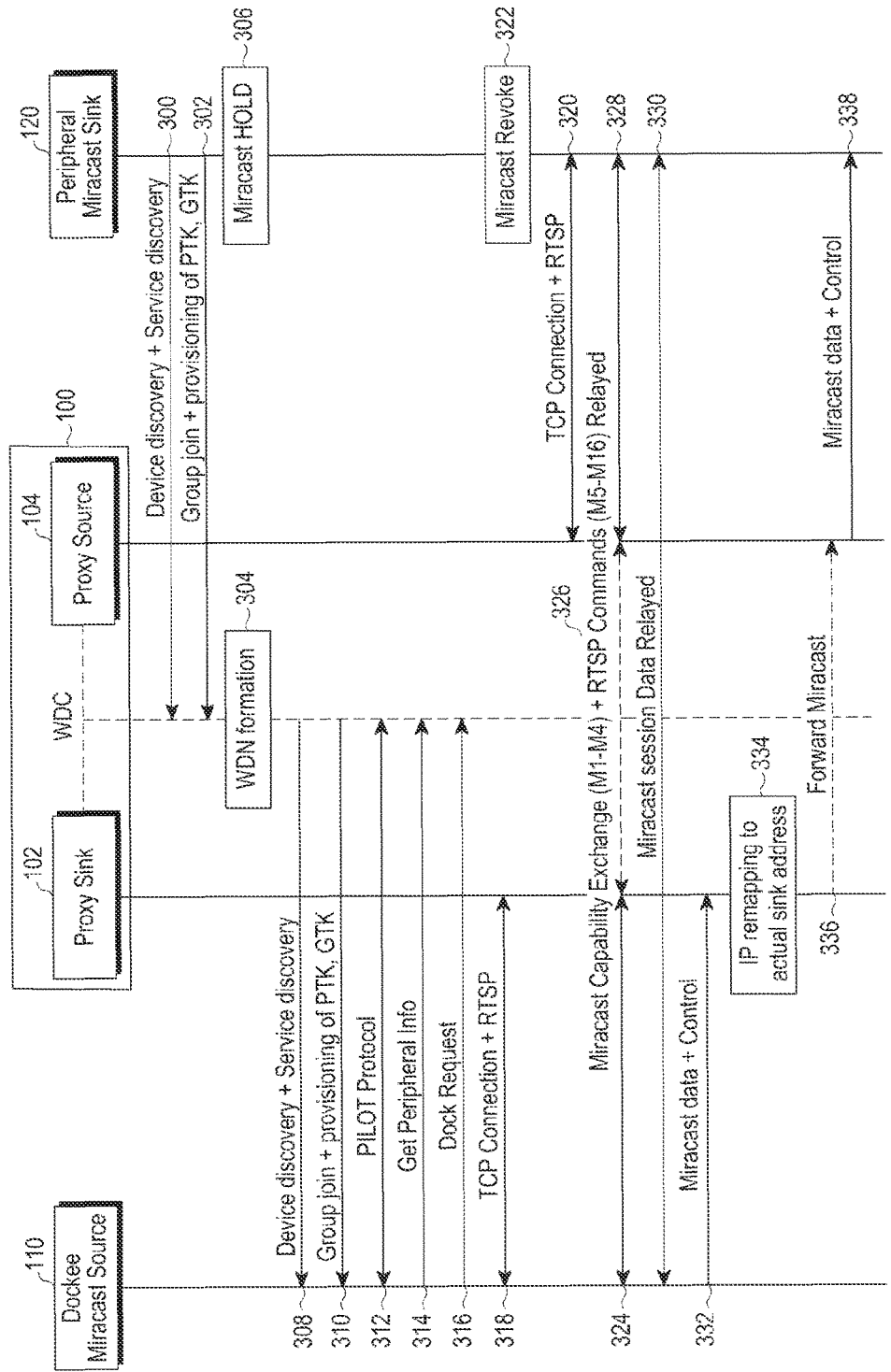
FIG. 3 is a diagram illustrating a procedure of a proxy operation, according to an embodiment of the present invention.

FIG. 3 is a diagram illustrating a procedure of a proxy operation, according to an embodiment of the present invention.

The peripheral device 120 exchanges a device discovery signal and a service discovery signal with the WDC 100, in step 300.

The peripheral device 120 or sink device, such as a TeleVision (TV), a monitor, or a tablet, is associated with the WDC 100 operating as the proxy source 104 through the discovery procedure of step 300. Specifically, the WDC 100 may transmit a probe request to the peripheral device 120 and the peripheral device 120 may transmit a probe response in response to the probe request. The probe request may include WFD Information Elements (IEs), such as, for example, a device type (source, primary sink, or the like) information, device state information, and the like. The WDC 100 may temporarily store the information received from the peripheral device 120 in a temporary storage unit within the WDC 100 under a category device discovery.

After the device discovery, the WDC 100 may retrieve detailed information from the peripheral device 120 by using a service discovery mechanism. Service discovery information may also be stored in the temporary storage unit within the WDC 100 under a category service discovery.

The peripheral device 120 performs a P2P connection with the WDC 100 and forms a P2P group, in step 302. Selectively, a secret key (PTK or GTK) used for secure communication may be provided between the GO of the formed P2P group and the GC.

After it is determined that the source device is connected to the sink device in the Wi-Fi display, a connectivity resolution is performed. In the Wi-Fi display, the source device and the sink device may support a P2P or TDLS mode operation. However, in the proxy solution provided by embodiments of the present invention, the actual source device has not been yet connected, so that the connectivity resolution may correspond to P2P. Accordingly, the proxy device, that is, the WDC 100, and the peripheral device 120 establish the P2P connection and form the P2P group.

The WDC 100 or the peripheral device 120 may be the GO of the P2P group based on an intent value. In general, the WDC has the highest intent value and the WDC 100 is recommended as the GO. The peripheral device 120 will be the GC in the P2P group. The intent value is a value indicating a degree of desire to become the GO. For example, the intent value is a value between 0 to 15, and may be determined directly by the device.

The WDC 100 forms a WDN including the peripheral device 120, in step 304.

Until the dockee 110 corresponding to the Miracast source is docked to the WDC 100, the WDC 100 and the peripheral device 120 holds the remaining sequences, in step 306.

The dockee 110 exchanges a device discovery signal and a service discovery signal with the WDC 100, in step 308. In step 308, the dockee 110 recognizes that the WDC 100 has the peripheral device 120 associated with the WDC 100.

In a pre-association discovery procedure, limited information on the peripheral device 120 may be shared with the WDC 100. The shared information may be shared using, for example, a harmonized service discovery mechanism, such as a Generic Advertisement Service (GAS) frame.

After step 308, the dockee 110 performs a P2P connection with the WDC 100 and forms a P2P group, in step 310. Selectively, a secret key (PTK or GTK) used for secure communication may be provided between the GO of the formed P2P group and the GC.

The dockee 110 is connected to the WDC 100 and starts a pilot protocol, in step 312. In an embodiment of the present invention, the pilot protocol refers to a connection between the dockee and the WDC by using a protocol, such as, for example, Universal Plug and Play (UPnP). The dockee 110 obtains more detailed information on the peripheral device 120 by sending a 'Get Peripheral Info' message to the WDC 100, in step 314.

After the pilot protocol procedure, the dockee 110 transmits a dock request message to the WDC 100 to be docked to the WDC 100, in step 316. Further, the dockee 110 may belong to the WDN formed by the WDC 100. The WDN includes the peripheral device 120 associated with the WDC. In this case, the WDC 100 may select a proxy mode operation for the Miracast protocol to transmit content data (Miracast data) and informs the dockee 110 of the selected proxy mode.

When the dockee 110 is docked to the WDC 100, the Miracast protocol (Peripheral Function Protocol (PFP)) may be set to operate between the Miracast source (that is, dockee) 110 and the proxy sink 102 on the WDC 100. The discovery and P2P connection procedure for the docking between the dockee 110 and the WDC 100 may be re-used for driving (or running) the Miracast protocol.

There are two alternatives for a TCP connection setup between the dockee 110 and the peripheral device 120.

In the first alternative, the dockee 110 sets up a TCP connection with the proxy sink 102 of the WDC 200, in step 318, and the proxy source 104 sets up a TCP connection with the peripheral device 120, in step 320. Before the setup of the TCP connection with the proxy source 104, the peripheral device 120 revokes the held Miracast procedure corresponding to step 306, in step 322.

Specifically, on the dockee 110 side, the WDC 100 may serve as a TCP client and the dockee 110 may serve as a TCP server. For example, a particular control port such as, for example, port 7236, may be used for the purpose of the Miracast. When the TCP connection between the dockee 110 and the proxy sink 102 is successfully established, an RTSP stack is activated in all of the devices. An RTP media session between the dockee 110 and the proxy sink 102 may be in the active state until the RTSP session is disconnected.

On the peripheral device 120 side, the WDC 100 may serve as a TCP server and the peripheral device 120 may serve as a TCP client. For example, a particular control port such as, for example, port 7236, may be used for the purpose of the Miracast. When the TCP connection between the proxy source 104 of the WDC 100 and the peripheral device 120 is successfully established, the RTSP stack is activated in all if the devices. An RTP media session between the proxy source 104 and the peripheral device 120 may be in the active state until the RTSP session is disconnected.

In the second alternative, the TCP connection is established between the dockee 110, corresponding to the actual Miracast source, and the peripheral device 120, corresponding to the actual Miracast sink. That is, instead of the two sessions in the first alternative, one RTP or one RTSP session is established between the dockee 110 and the peripheral device 120.

Although FIG. 3 applies the first alternative having the two TCP connections (that is, two RTP sessions or two RTSP sessions) indicated by steps 318 and 320, embodiments of the present invention are not limited to the form illustrated in FIG. 3, and the second alternative may be applied.

The dockee 110 and the peripheral device 120 perform capability exchange procedures, in steps 324, 326, and 328, through the proxy (WDC 100) in the established RTSP session. That is, the dockee 110 and the peripheral device 120 exchange RTSP messages M1 to M4 through the established RTSP session.

Since the RTSP stack is in the active state in the devices (the dockee 110, the WDC 100, and the peripheral device 120), M1 to M4 requests will immediately be transmitted via the WDC (without storage in the WDC). An example of a procedure of transmitting the M1 to M4 requests is set forth in detail below with reference to FIG. 4.

Figure 4:
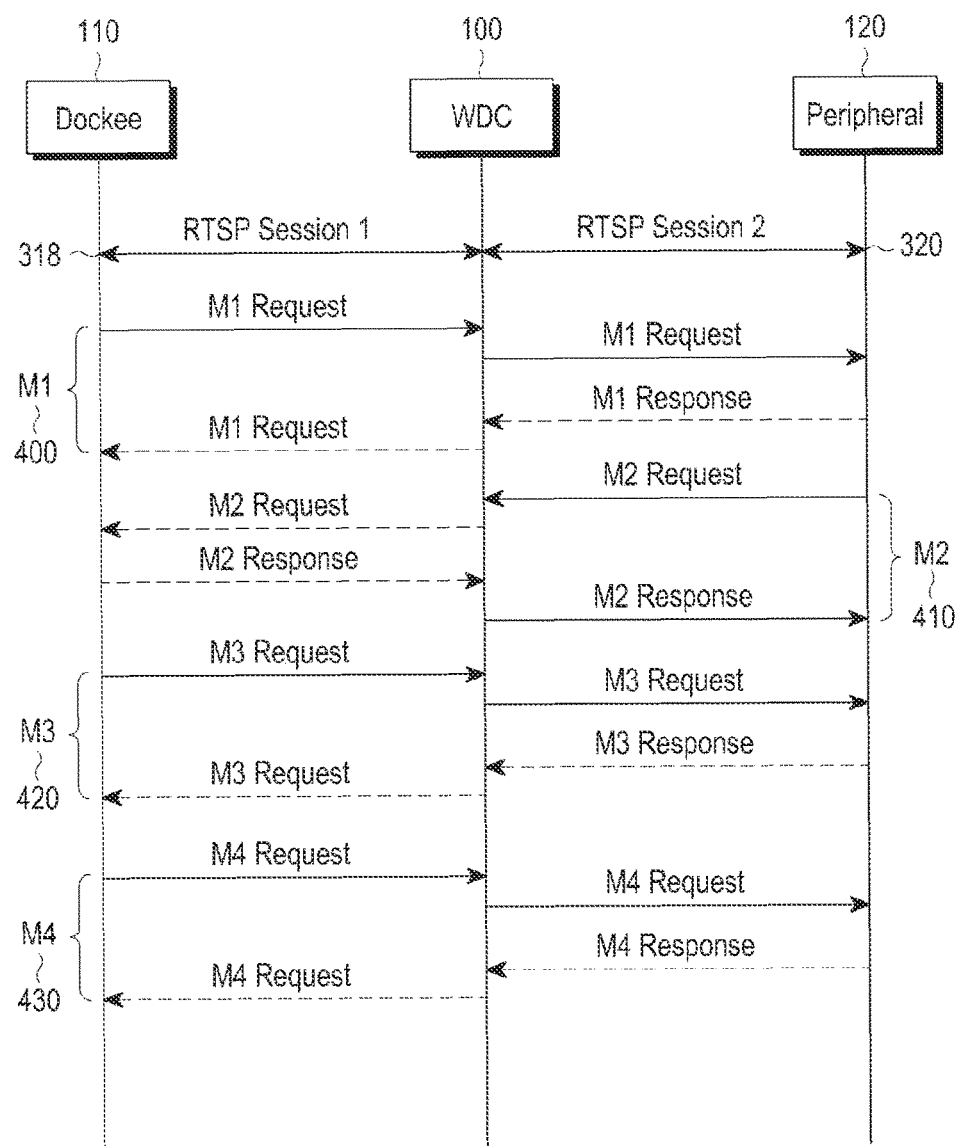
FIG. 4 is a diagram illustrating a capability exchange procedure generated between a dockee, a WDC, and a peripheral device, according to an embodiment of the present invention.

FIG. 4 is a diagram illustrating a capability exchange procedure generated between the dockee, the WDC, and the peripheral device, according to an embodiment of the present invention.

The dockee 110 and the peripheral device 120 perform the capability exchange procedure by transmitting the messages M1 to M4 through the RTSP sessions, in steps 318 and 320, established with the WDC 100. The messages M1 to M4 may be exchanged between the devices to inform each other of detailed capabilities of the devices, and may be used to select an operation parameter of a particular Wi-Fi display session.

The dockee 110 transmits an M1 request message to the peripheral device 120 through the WDC 100, and selectively, may receive a response message of the M1 request message from the peripheral device 120, in step 400.

The peripheral device 120 transmits an M2 request message to the WDC 100 and receives a response message of the M2 request message, in step 410. Selectively, the WDC 100 may transmit the M2 request message received from the peripheral device 120 to the dockee 110, and receive the response message of the transmitted M2 message.

The dockee 110 transmits an M3 request message to the peripheral device 120 through the WDC 100, and selectively, may receive a response message to the M3 request message from the peripheral device 120, in step 420.

The dockee 110 transmits an M4 request message to the peripheral device 120 through the WDC 100, in step 430.

Selectively, the dockee 110 may receive a response message to the M4 request message from the peripheral device 120.

Alternatively, tunneled frames are supported by the WDC 100, and the messages M1 to M4 may be tunneled through the WDC 100.

Similar to the message exchanged in the capability exchange procedure, RTSP messages (that is, messages M5 to M16), exchanged before the WFD session establishment or during the WFD session, may also be relayed through the WDC.

Referring back to FIG. 3, similar to a control message, data packets transmitted in the RTP session on the dockee 110 side are relayed to the RTP session on the peripheral device 120 side through the WDC 100, in step 330. Further, the WDC 100 may be implemented to maintain enough buffers to relay the packet data.

Specifically, packet data and control data for content are transmitted to the proxy sink 102 of the WDC 100 from the dockee 110, in step 332. Further, the WDC 100 remaps a destination IP address of the data received from the dockee 110 to an IP address of the actual sink device (that is, peripheral device 120), in step 334, and forwards the IP address to the proxy source 104, in step 336. The forwarded data is transmitted to the peripheral device 120 from the proxy source 104, in step 338.

Another embodiment of the present invention is set forth below in which the sink device and the WDC establish a WFD session without waiting for the docking of the dockee.

Figure 5:
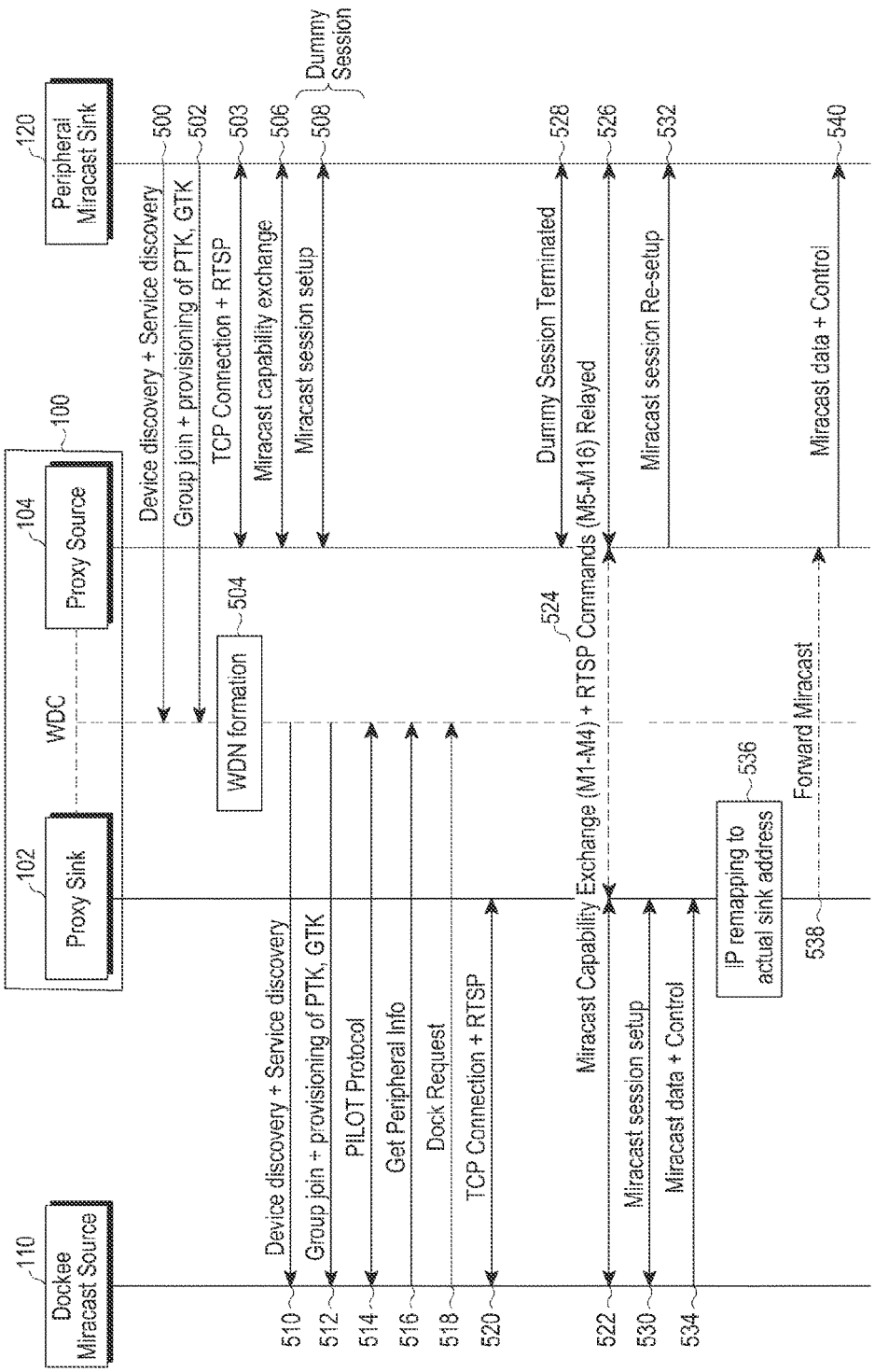
FIG. 5 is a diagram illustrating a procedure of a proxy operation, according to another embodiment of the present invention.

FIG. 5 illustrates a procedure of a proxy operation, according to another embodiment of the present invention.

The peripheral device 120 exchanges a device discovery signal and a service discovery signal with the WDC 100, in step 500.

The peripheral device 120 or sink device, such as a TV, a monitor, or a tablet, may be associated with the WDC 100 operating as the proxy source 104 through step 500. Specifically, the proxy source may transmit a probe request to the Miracast sink and the Miracast sink may transmit a probe response to respond to the probe request. The probe request may include WFD IEs, such as a device type (source, primary sink, or the like), a device state, and the like. The WDC 100 may temporarily store the information received from the peripheral device 120 in a temporary storage unit under a category device discovery.

After the device discovery, the WDC 100 may retrieve detailed information from the peripheral device 120 by using a service discovery mechanism. Service discovery information may also be stored in the temporary storage unit within the WDC 100 under a category service discovery.

The peripheral device 120 performs a P2P connection with the WDC 100 and forms a P2P group, in step 502. Selectively, a secret key (PTK or GTK) used for secure communication may be provided between the GO of the formed P2P group and the GC.

After it is determined that the source device is connected to the sink device in the Wi-Fi display, a connectivity resolution is performed. In the Wi-Fi display, the source device and the sink device may support a P2P or TDLS mode operation. However, in the proxy solution provided by embodiments of the present invention, the actual source device has not been yet connected, so that the connectivity resolution may correspond to P2P. Accordingly, the proxy source device and the Miracast sink device select a P2P mode connection. Further, the proxy device, that is, the WDC 100, and the peripheral device 120 establish the P2P connection and form the P2P group. The WDC 100 or the peripheral device 120 may be the GO of the P2P group based on an intent value. In general, the WDC has the highest intent value and the WDC 100 is recommended as the GO. The peripheral device 120 will be the GC in the P2P group.

The WDC 100 forms a WDN including the peripheral device 120, in step 504.

In this embodiment of the present invention, the peripheral device 120 immediately establishes the TCP connection without waiting for the TCP connection between the dockee 110 and the WDC 100. That is, after the P2P connection establishment between the proxy source 104 and the peripheral device 120, the devices may establish a TCP connection therebetween, in step 503.

The WDC 100 serves as a TCP server and the peripheral device 120 serves as a TCP client. For example, a particular control port such as, for example, port 7236, may be used for the purpose of the Miracast. When the TCP connection between the proxy source 104 of the WDC 100 and the peripheral device 120 is successfully established, the RTSP stack is activated in the devices (the WDC 100 and the peripheral device 120). Further, an RTP media session may be in the active state until the RTSP session is disconnected.

After the RTSP stack becomes active in the devices, the proxy source 104 of the WDC 100 and the Miracast sink device may perform the capability exchange by transmitting/receiving the messages M1 to M4, in step 506. The messages M1 to M4 may be exchanged between the devices to inform each other of detailed capabilities of the devices, and may be used to select an operation parameter of a particular Wi-Fi display session.

Specifically, the exchange of the messages M1 to M4 between the peripheral device 120 and the WDC 100, in a state where the dockee 110 is not docked to the WDC 100, may be made as follows.

The proxy source 104 of the WDC 100 transmits an M1 request message (including RTSP options) to the peripheral device 120, and the peripheral device 120 responds to the M1 request message with a list of the RTSP options, which the peripheral device 120 can support. Selectively, the RTSP options may meet with a Miracast specification.

The peripheral device 120 transmits an M2 request message (including RTSP options) to the proxy source 104 (since the dockee has not yet docked), and the proxy source 104 responds to the M2 request message by means of a dummy message, which does not include the RTSP options in the list.

The proxy source 104 transmits an M3 request message (including "RTSP GET_PARAMETER") specifying a list of capabilities in which the proxy source is interested. Selectively, in a proxy mode, the M3 request message may include an empty list.

The proxy source 104 transmits an M4 request message (including "RTSP SET_PARAMETER") selecting a set of optimal parameters, which can be used as the WFD session). Selectively, in a proxy mode, the M4 request message may also include an empty list.

After the capability exchange procedure, both devices (the WDC and the peripheral device) attempt to establish the WFD session (that is, Miracast session), in step 508.

Selectively, control messages M5 to M16 may be exchanged between the proxy source 104 and the peripheral device 120.

Content data is transmitted to the sink device (that is, the peripheral device 120) by the source device (that is, the dockee 110), but an RTSP command may be transmitted only by the sink device. Accordingly, in order to generate a request from the sink device, the proxy source 104 may transmit a message M5 having a name of the command to the peripheral device 120, and the sink device may transmit an actual command corresponding to a name indicated by the message M5 to the proxy source 104.

M6 corresponds to a "SETUP" command that sets up the WFD session.

M7 corresponds to a "PLAY" command that initiates a reproduction of content. The WFD session may be successfully established after an M7 request and an M7 response are successfully transmitted and received between the peripheral device 120 and the proxy source 104. That is, the RTP media session may successfully start. However, since the actual source device (that is, the dockee 110) does not exist, the RTP session is a dummy session (having no actual data) between the proxy source 104 and the peripheral device 120. Alternatively, the proxy source 104 may maintain the RTP session by transmitting a default screen saver or a picture to the peripheral device 120.

The WDC 100 may include a data buffer to extract a content packet, which can be transmitted to the peripheral device 120 through the RTP session. When the dockee 110 has not been yet docked, the data buffer may be empty or may have default data.

The dockee 110 corresponding to the Miracast source discovers the WDC 100 by exchanging a device discovery signal and a service discovery signal with the WDC 100, in step 510. In the discovery procedure of step 510, the dockee 110 may recognize that the WDC 100 has the Miracast sink associated with the WDC 100, that is, the peripheral device 120.

In a pre-association discover procedure, limited information on the peripheral device 120 may be shared with the WDC 100. The shared information may be shared using, for example, a harmonized service discovery mechanism, such as, for example, a GAS frame.

After the discovery procedure of step 510, the dockee 110 performs a P2P connection with the WDC 100 and forms a P2P group, in step 512. Selectively, a secret key (PTK or GTK) used for secure communication may be provided between the GO of the formed P2P group and the GC.

The dockee 110 is connected to the WDC 100 and starts a pilot protocol, in step 514. The dockee 110 obtains more detailed information on the peripheral device 120 through the pilot protocol, in step 516.

After the pilot protocol procedure of step 514, the dockee 110 transmits a dock request message to the WDC 100 to be docked to the WDC 100, in step 518. Further, the dockee 110 may belong to the WDN formed by the WDC 100. The WDN includes the peripheral device 120 associated with the WDC. In this case, the WDC 100 may select a proxy mode operation for the Miracast protocol to transmit content data (Miracast data) and informs the dockee 110 of the selected proxy mode. Further, the WDC 100 may inform the dockee 110 that a dummy session has already started in the peripheral device 120.

When the dockee 110 is docked to the WDC 100, the Miracast protocol (Peripheral Function Protocol (PFP)) may be set to operate between the Miracast source (the dockee) 110 and the proxy sink 102 on the WDC 100. The discovery and P2P connection procedure for the docking between the dockee 110 and the WDC 100 may be re-used for driving (or running) the Miracast protocol. A TCP connection is then immediately set up between the devices.

The dockee 110 sets up the TCP connection with the WDC 100, in step 520.

On the dockee 110 side, the WDC 100 may serve as a TCP client and the dockee 110 may serve as a TCP server. For example, a particular control port such as, for example, port 7236, may be used for the purpose of the Miracast. When the TCP connection is successfully established between the dockee 110 and the proxy sink 102 of the WDC 100, the RTSP stack become active in the devices. Further, an RTP media session may be in the active state until the RTSP session is disconnected.

On the peripheral device 120 side, the TCP connection has been already set up and the Miracast dummy session is operating. In step 528, the dummy session set up in the peripheral device 120 ends immediately when the TCP connection between dockee 110 and the WDC 100 is established.

Subsequently, the capability exchange procedure and the WFD session establishment may be performed again.

The dockee 110 and the peripheral device 120 perform capability exchange procedures, in steps 522, 524, and 526, through the proxy (WDC 100) in the established RTSP session. That is, the dockee 110 and the peripheral device 120 exchange RTSP messages M1 to M4 through the established RTSP session.

Since the RTSP stack is in the active state in the devices (the dockee 110, the WDC 100, and the peripheral device 120), M1 to M4 requests will be transmitted via the WDC immediately (without storage in the WDC 100).

Alternatively, tunneled frames are supported by the WDC 100, and the messages M1 to M4 may be tunneled through the WDC 100.

Similar to the messages exchanged in the capability exchange procedure, RTSP messages (that is, messages M5 to M16), exchanged before the WFD session establishment or during the WFD session, may be also relayed through the WDC 100.

Similar to a control message, data packets transmitted in the RTP session in a side of the dockee 110, are relayed to the RTP session in a side of the peripheral device 120 through the WDC 100, in steps 530 and 532. Further, the WDC 100 may be implemented to maintain enough buffers to relay the packet data.

Specifically, packet data and control data for content are transmitted to the proxy sink 102 of the WDC 100 from the dockee 110, in step 534. Further, the WDC 100 remaps a destination IP address of the data received from the dockee 110 to an IP address of the actual sink device (the peripheral device 120), in step 536, and forwards the IP address to the proxy source 104, in step 538. The forwarded data may be transmitted to the peripheral device 120 from the proxy source 104, in step 540.

Figure 6:
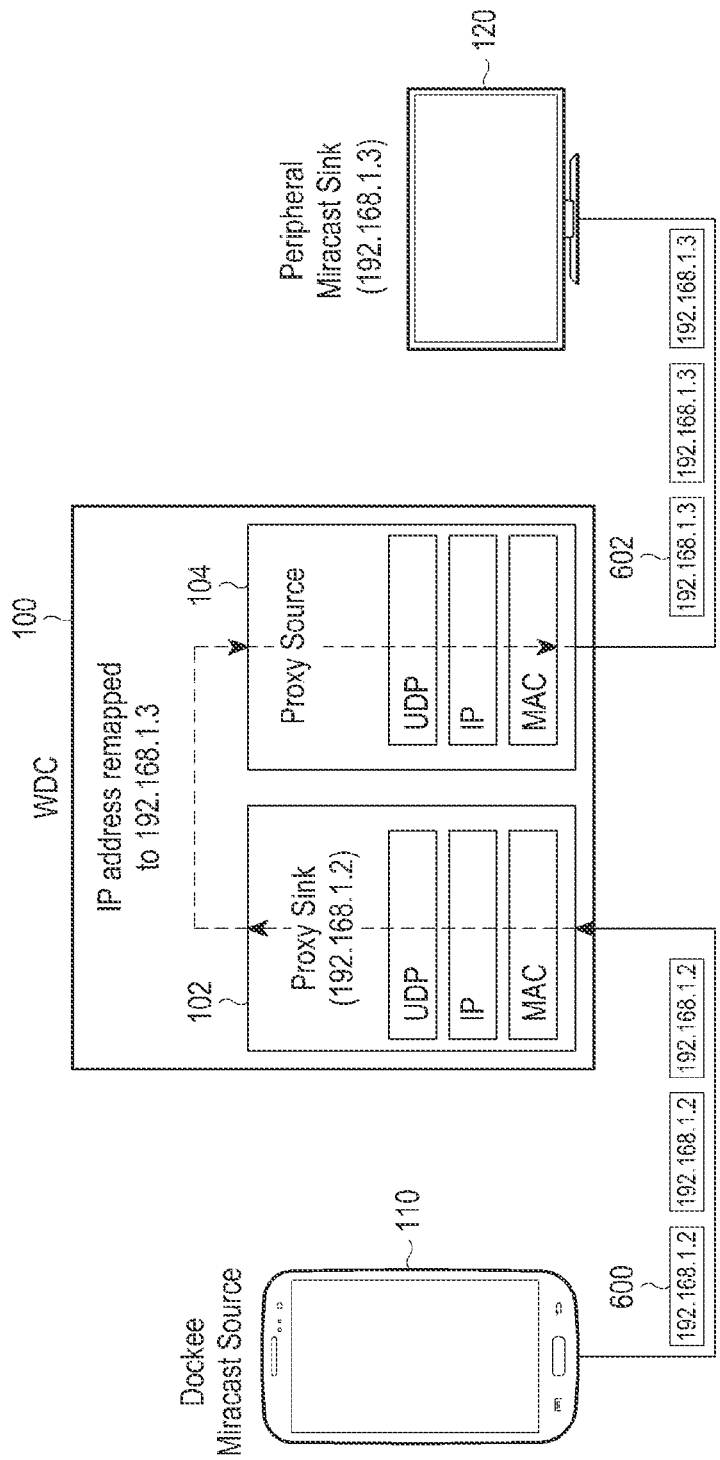
FIG. 6 is a diagram illustrating a flow of a packet, which a dockee transmits to a peripheral device, through a WDC in a docking environment, according to an embodiment of the present invention.

FIG. 6 is a diagram illustrating a flow of a packet, which the dockee transmits to the peripheral device through the WDC in a docking environment, according to an embodiment of the present invention.

A packet 600 of content data transmitted to the proxy 100 from the dockee 110 has an IP address (for example, "192.168.1.2") of the WDC 100 as a destination IP address. The packet 600 is input into the proxy sink 102 of the WDC 100, and transmitted to the proxy source 104 by the WDC 100. The WDC 100 remaps the destination IP address of the packet 600 to an IP address of the peripheral device 120 corresponding to the actual sink device. For the remapping, the data packet transmitted to the WDC 100 from the dockee 110 is decrypted and then re-encrypted before the transmission to the peripheral device 120. FIG. 6 illustrates that a data packet 602 transmitted to the peripheral device 120 from the proxy source 104 of the WDC 100 has a destination IP address remapped to an IP address (for example, "192.168.1.3") of the peripheral device 120.

Similarly, the same operation (that is, remapping of the IP address) may be applied to data transmitted to the dockee 110 from the peripheral device 120 through the WDC 100.

As described above, the operation of remapping the IP address of the transmitted data packet requires operations for decrypting and encrypting the packet, and an operation in a layer higher than an IP layer of the WDC 100, and this may lead to a latency problem.

Accordingly, embodiments of the present invention suggest an improved scheme that can solve the latency problem.

The Wi-Fi display operation (that is, proxy mode operation) using the WDC, according to an embodiment of the present invention, may be further improved by a direct RTP connection between the dockee and the peripheral device, instead of an IP address translation (that is, remapping) by the WDC device. An advantage of such a method is that the remapping of the IP address by the WDC is not always required and improved transmission is provided to RTP traffic sensitive to the latency. Further, a suggested mechanism does not ask any change of the peripheral device corresponding to a product that has been released on the market.

For convenience of description, a proxy procedure described below is hereinafter referred to as a "hybrid proxy mode". That is, the hybrid proxy mode refers to a proxy mode supporting a direct RTP connection between the dockee and the peripheral device by the WDC device.

Since a basic procedure related to the P2P connection and the docking between devices has been described in the above embodiments of the present invention, only a Miracast session connection procedure will be described.

Figure 7:
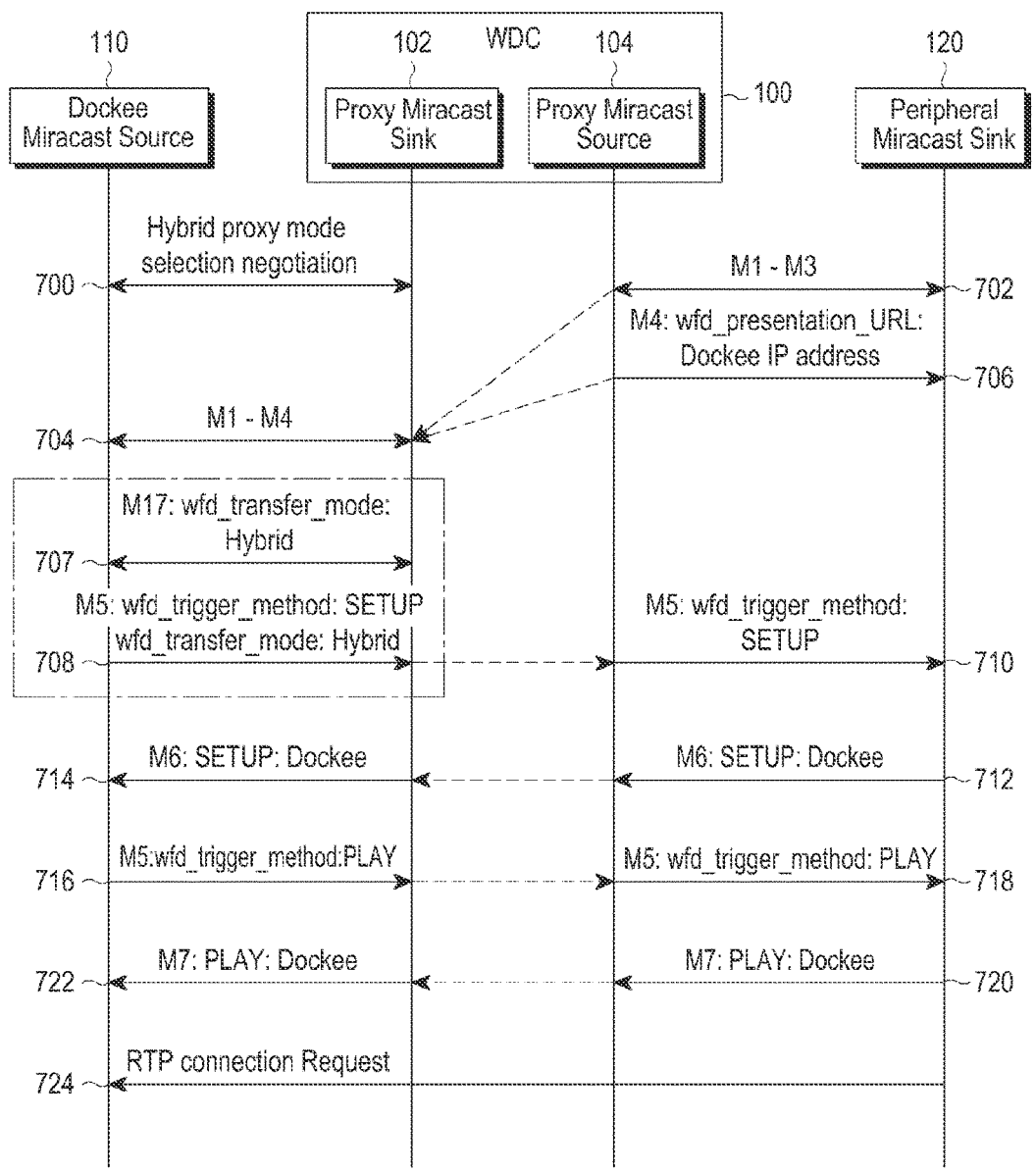
FIG. 7 is a diagram illustrating a mechanism for improved proxy operation, according to an embodiment of the present invention.

FIG. 7 is a diagram illustrating a mechanism for an improved proxy operation, according to an embodiment of the present invention.

After the dockee 110 and the peripheral device 120 are connected to the WDC 100, the dockee 110 and the WDC 100 perform a hybrid proxy mode selection negotiation, in step 700. Specifically, the dockee 110 notifies the WDC 100 that the hybrid proxy mode is required. When the WDC 100 can support the hybrid proxy mode, the WDC 100 may provide a confirmation to the dockee 100.

The WDC 100 initiates a Miracast capability negotiation with the peripheral device 120 through RTSP messages M1 to M3, in step 702.

Capability information obtained through the RTSP messages M1 to M3 between the WDC 100 and the peripheral device 120 may be cached in the WDC 100 to be provided to the dockee 110 through the RTSP messages M1 to M3 messages or proxy-transmitted to the dockee 110 in real time.

During the capability negotiation procedure spanning the Miracast messages M1 to M4, the WDC 100 provides an IP address of the dockee 110 instead of an IP address of the WDC 100 from "wfd_presentation_URL" within the message M4, in step 706. Accordingly, the peripheral device 120 may use the IP address of the dockee 110 and provide information required for the RTP connection to the dockee 110.

Completion of the exchange of the message M4, in steps 704 and 706, allow the devices to initiate the Miracast session. However, before the setup of the Miracast session, the proxy sink 102 of the WDC is required to receive signaling that notifies of the hybrid proxy mode.

A reason for the signaling is to allow the proxy sink 102 of the WDC 100 to switch between the hybrid proxy mode and the general Miracast mode. The WDC 100 may be connected to a wireless Miracast peripheral device or a display device of a wired High Definition Multimedia Interface (HDMI) type. Since a Miracast standard accepts a connection to only one sink device, if there is no signaling, the dockee 110 may simultaneously receive RTP connection requests which may cause an undesired connection scenario or a connection error from not only the peripheral device 120 but also the WDC 100. Accordingly, when the hybrid proxy mode is used, the signaling may report the proxy sink 102 of the WDC 100 not to initiate the RTP connection of the general Miracast mode. It may prevent the generation of a problem related to the RTP connection.

Notification of the hybrid proxy mode of the WDC 100 from the dockee 110 may be signaled through three methods.

A first method is to transmit a new separate Miracast message M17, in step 707. The new message M17 in step 707 may include a new parameter attribute of "wfd_transfer_mode". The attribute "wfd_transfer_mode" may include a value indicating the "hybrid proxy mode" and also include another value such as proxy or transparent tunnel.

A second method is to add the attribute "wfd_transfer_mode" to the message M5 making a request for the setup of the Miracast session when transmitting the message M5. The attribute "wfd_transfer_mode" may include a value indicating the "hybrid proxy mode".

A third method is to transmit a separate out of band signaling to inform the Miracast module of the WDC of the hybrid proxy mode. Although the signaling by the third method is not illustrated in FIG. 7, it is the applied signaling method in FIG. 8.

When signaling by one of the three methods is completed, the remaining procedures for the WFD session setup may be performed. Specifically, the message M6 including a "SETUP" command of the WFD session is transmitted/received, in steps 712 and 714, the message M5 including a "PLAY" command of the WFD session is transmitted/received, in steps 716 and 718, and the message M7 of the "PLAY" command for initiating a content reproduction is transmitted/received, in steps 720 and 722. Further, an RTP connection request message may be transmitted to the dockee 110 from the peripheral device 120, in step 724.

The peripheral device 120 having received the attribute "wfd_presentation_URL" through the message M4 is connected to the dockee to generate the RTP connection. After mirroring (that is, after the dockee and the peripheral device establish the RTP connection), the content may be transmitted between the dock and the peripheral device. At this time, the WDC 100 may perform only transmission of the packet in layer 2 (MAC layer) without the decryption and encryption of the data packet and the remapping of the IP address. That is, the WDC 100 merely serves as a relay. Since the packet decryption or encryption or the remapping is not performed by the WDC 100, the latency problem can be solved.

However, the control message of the Miracast session through the RTSP may be still processed between the dockee and the peripheral device by the WDC 100 in the proxy mode. That is, the control message through the RTSP may be transmitted after the performance of the decryption, the encryption, or the IP remapping by the WDC 100.

Figure 8:
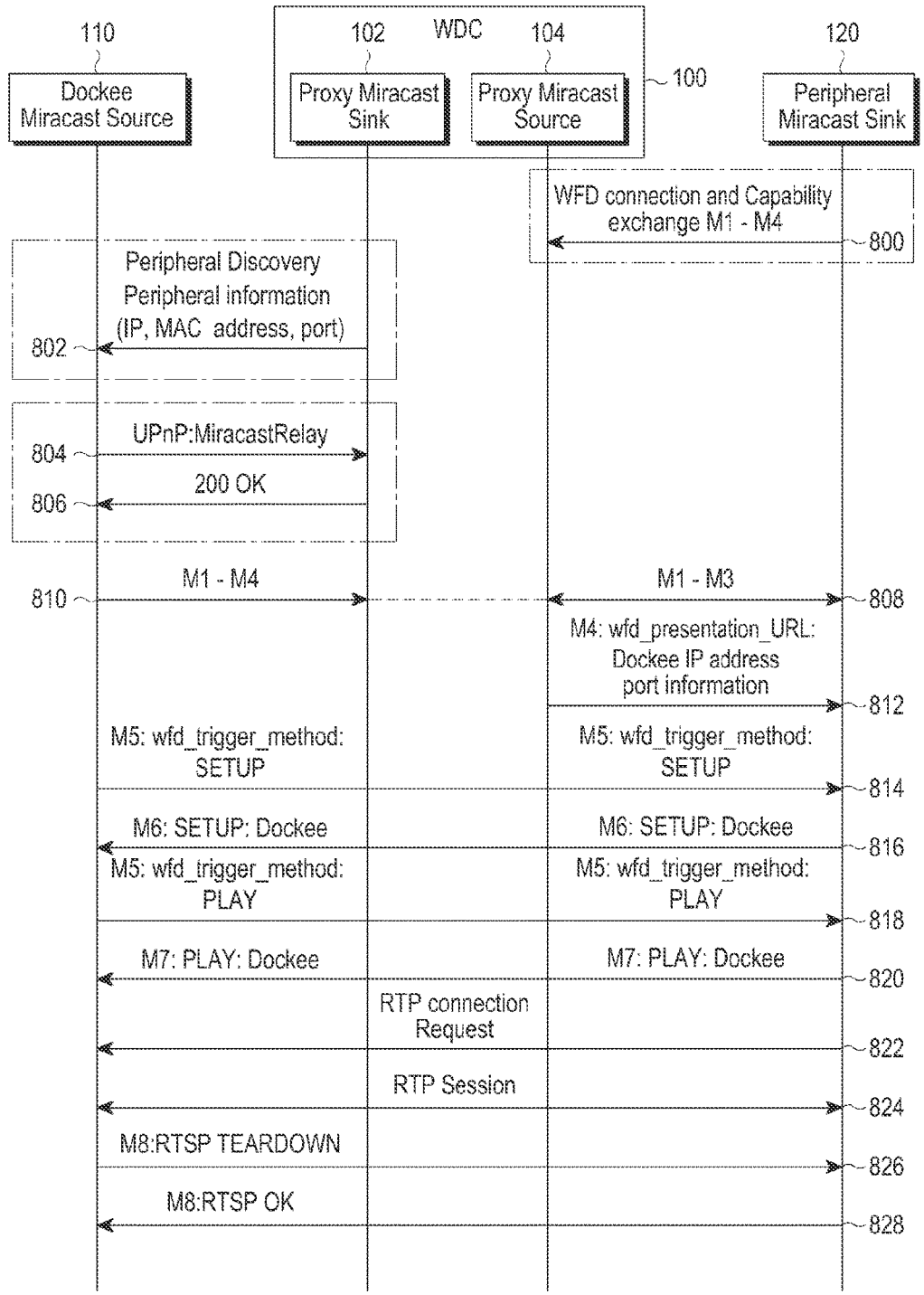
FIG. 8 is a diagram illustrating a method in which relaying (layer 2 forwarding based on an MAC address of a destination) using a WDC is applied to an RTP message and an RTSP message, according to an embodiment of the present invention.

FIG. 8 is a diagram illustrating a method in which relaying (layer 2 forwarding based on a MAC address of a destination) using the WDC is applied not only to an RTP message but also to an RTSP message, according to an embodiment of the present invention.

Selectively, before the dockee 110 is docked to the WDC 100, the WDC 100 and the peripheral device 120 may perform the capability negotiation procedure through the messages M1 to M4. The WDC 10 obtains an IP address, a MAC address, and a port number of the peripheral device 120 during a discovery procedure of the peripheral device 120 or the capability negotiation procedure, in step 800.

Selectively, the dockee 110 may obtain information on the peripheral device 120 during a peripheral device discovery procedure and select the peripheral device 120, in step 802. The obtained information may include at least one of the IP address, MAC address, and port number of the peripheral device 120.

After the dockee 110 and the peripheral device 120 are connected to the WDC 100, the dockee 110 selectively performs an operation of informing the WDC 100 that the hybrid proxy mode is required, in step 804. Specifically, the dockee 110 may inform the WDC 100 through out of band signaling, such as a UPnP message, that the "hybrid proxy mode" is required. For example, the UPnP message may include a value indicating "MiracastRelay". The signaling informing that the "hybrid proxy mode" is required may be performed through another method (that is, the first method or the second method) described above in FIG. 7.

When the WDC 100 supports the hybrid proxy mode, the WDC 100 selectively transmits an approval (for example, a '200 OK" message) to the dockee 110, in step 806.

Subsequently, the WDC 100 initiates the Miracast capability negotiation with the peripheral device 120, in step 808. Capability information obtained through the RTSP messages M1 to M3 between the WDC 100 and the peripheral device 120 may be cached in the WDC 100 to be provided to the dockee 110 through the RTSP messages M1 to M3 or proxy-transmitted to the dockee 110 in real time.

During the capability negotiation procedure spanning the Miracast messages M1 to M4, the WDC 100 provides an IP address of the dockee 110 instead of an IP address of the WDC 100 from "wfd_presentation_URL" within the message M4, in step 812. Accordingly, the peripheral device 120 may use the IP address of the dockee 110 and provide information required for the RTP connection to the dockee 110.

Completion of the exchange of the message M4, in steps 810 and 812, allow the devices (that is, the peripheral device 120 and the dockee 110) to initiate the WFD session.

As described above, when the capability exchange between the dockee 110 and the peripheral device 120 is completed, the dockee 110 transmits the RTSP message M5 to the peripheral device 120 to initiate the WFD session, in step 814.

The dockee 110 and the peripheral device 120 have informed each other of their IP addresses and MAC addresses. Accordingly, the dockee 110 uses the IP address and the MAP address of the peripheral device 120 received during the discovery as a destination of the RTSP message M5, in steps 814 and 818, and as a destination of a Miracast payload of an RTP stream, in step 824. Further, the peripheral device 120 uses the IP address and the MAC address of the dockee 110 as destinations of all communication related to the RTSP messages M6 to M16, in steps 816, 820, and 822.

The WDC 100 receives an RTSP message or an RTP message having an address of the peripheral device 120 as a destination IP address or MAC address from the dockee 110, and forwards the received message and all RTSP messages received from the peripheral device 120 and transmitted to the dockee 110. The WDC 100 may perform only packet forwarding in layer 2 (MAC layer) without the decryption and encryption of the data packet or the remapping of the IP address. That is, the WDC 100 merely serves as a relay.

When the dockee 110 determines to end the WFD session, the dockee 110 transmits an RTSP teardown message M8 to the peripheral device 120, in step 826, and undocks or deselects the peripheral device 120. Further, the peripheral device 120 transmits a response message of the RTSP message M8 to the dockee 110, in step 828.

In an embodiment of the present invention, the WDC 110 forwards the RTSP message M8 to the peripheral device 120. In another embodiment of the present invention, the WDC 100 may maintain the WFD session with the peripheral device 120 by transmitting a response of the RTSP message M8 to the dockee 110 on behalf of the peripheral device 120 without forwarding the RTSP message to the peripheral device.

In a 'MiracastRelay' mode (that is, hybrid proxy mode) operation, High-bandwidth Digital Content Protection (HDCP) may be supported.

A method of supporting the HDCP in the 'MiracastRelay' mode operation is described with reference to FIG. 8. That is, the HDCP supporting operation may be performed with some of the operations illustrated in FIG. 8 or with some of operations that have been changed as compared to the operations illustrated in FIG. 8.

When the peripheral device 120 is initially connected to the WDC 100 and exchanges of the messages M1 to M4 are made, in step 800, the WDC 100 may not initiate an HDCP key exchange. Further, the WDC 100 may not insert an HDCP supporting parameter into the message M3. The WDC 100 acts like a device having no HDCP supporting capability and completes the message exchange. Further, the WDC 100 may postpone transmission of the message M5 until the dockee 110 is connected to the WDC 100.

When the dockee 110 is docked to the WDC 100, the dockee 110 may receive the IP address and the MAC address of the peripheral device 120 during the discovery, in step 802. The dockee 110 initiates the M1 to M4 capability exchange with the WDC 100 and information obtained by the capability exchange by the dockee 110 may be relayed to the peripheral device 120. When the dockee 110 supports the HDCP, the dockee 110 transmits the message M3 including an indication of the supporting of the HDCP, in step 810, and the peripheral device 120 responds to the message M3 by means of an response M3 including the IP address and the port number for the TCP connection for key negotiation, in step 808, and may start a server of TCP communication for the key negotiation.

The dockee 110 may directly initiate the key negotiation with the peripheral device 120 by using the received IP address and MAC address of the peripheral device 120. Similar to the data packet path and the RSTP message relaying described in FIG. 8, the WDC 100 may forward the key negotiation packets in layer 2 (MAC layer) based on the MAC address of the peripheral device 120.

When the key negotiation is completed, the message M4 may be transmitted to the peripheral device 120 from the dockee 110 (e.g., in step 812). Regardless of the completeness of the key negotiation, the message M4 may be selectively transmitted to the peripheral device.

When the RTSP session is established between the dockee and the peripheral device and the direct RTP session is set up between the dockee and the peripheral device, content data may be encrypted into the negotiated key and transmitted to the peripheral device from the dockee through the RTP session, in step 824.

Figure 9:
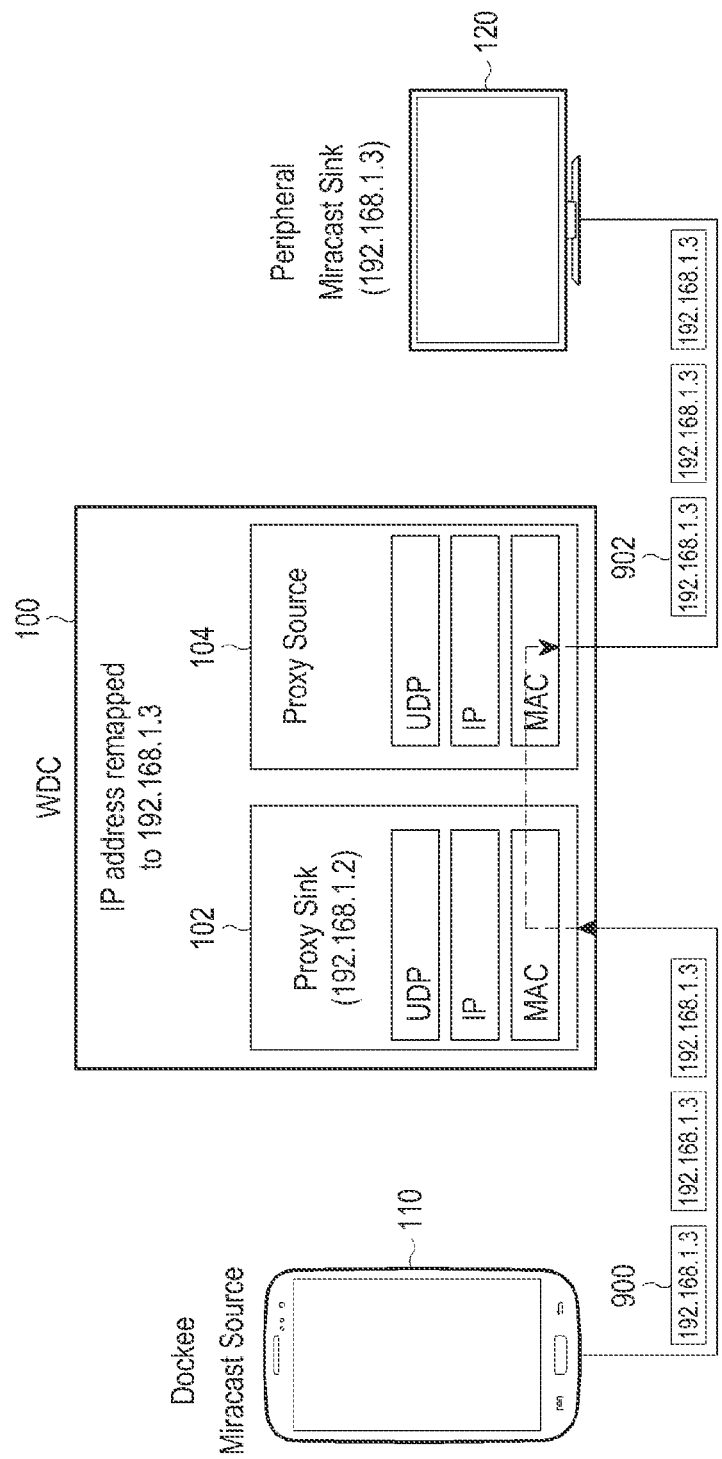
FIG. 9 is a diagram illustrating an operation of forwarding a packet in layer 2 of a WDC, according to an embodiment of the present invention.

FIG. 9 is a diagram illustrating an example of an operation of forwarding a packet in layer 2 of the WDC, according to an embodiment of the present invention.

It is noted that a destination address of a packet 900, transmitted to the WDC 100 from the dockee 110 through RTP session, has an IP address of "'192.168.1.3" of the peripheral device 120, not an IP address of "192.168.1.2" of the WDC 100. The destination address of the packet 900 may be the same as a destination address of a packet 902 transmitted to the peripheral device 120 from the WDC 100.

Accordingly, IP remapping by the WDC 100 is not generated. The WDC 100 may forward the data packet received from the dockee 110 to the peripheral device 120 only through processing in layer 2 (MAC layer).

Figure 10:
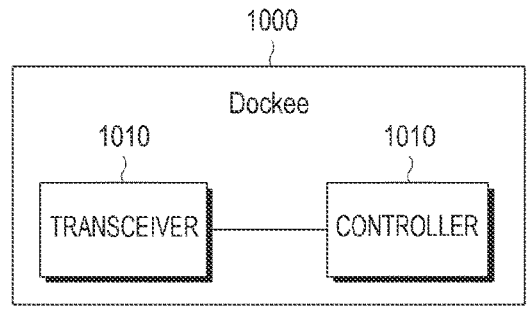
FIG. 10 is a block diagram illustrating a configuration of a dockee device, according to an embodiment of the present invention.

FIG. 10 is a block diagram illustrating a configuration of a dockee device, according to an embodiment of the present invention.

A dockee device 1000 includes a transceiver 1010 transmitting/receiving a signal to/from the WDC or the peripheral device, and a controller 1020 controlling the transceiver 1010.

The controller 1020 may be understood to perform all operations, which have been described as being performed by the dockee.

Although FIG. 10 illustrates the transceiver 1010 and the controller 1020 as separate components, the transceiver 1010 and the controller 1020 may be implemented as one component.

Figure 11:
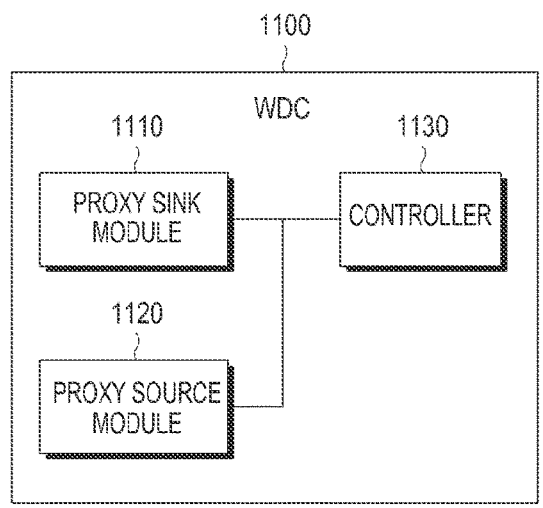
FIG. 11 is a block diagram illustrating a configuration of a WDC device, according to an embodiment of the present invention.

FIG. 11 is a block diagram illustrating a configuration of a WDC device, according to an embodiment of the present disclosure.

A WDC device 1100 includes a proxy sink module 1110, a proxy source module 1120, and a controller 1130 controlling the modules 1110 and 1120.

The proxy sink module 1110 may be understood to perform operations performed by the proxy sink of the WDC, and the proxy source module 1120 may be understood to perform operations performed by the proxy source of the WDC. The proxy sink module 1110 and the proxy source module 1120 may include a transmission/reception component for establishing a communication link with the peripheral device and the dockee, or communicating a signal.

The controller 1130 may be understood to perform all operations, which have been described as being performed by the WDC.

Although FIG. 11 illustrates the proxy sink module 1110, the proxy source module 1120, and the controller 1130 as separate components, the proxy sink module 1110, the proxy source module 1120, and the controller 1130 may be implemented as one component.

Figure 12:
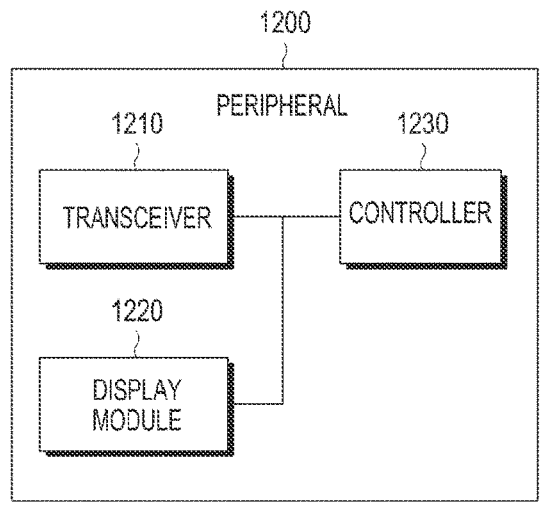
FIG. 12 is a block diagram illustrating a configuration of a peripheral device, according to an embodiment of the present invention.

FIG. 12 is a block diagram illustrating a configuration of a peripheral device, according to an embodiment of the present invention.

A peripheral device 1200 includes a transceiver 1210 communicating a signal with the dockee and the WDC, a display module 1220 reproducing and displaying content, and a controller 1230 controlling the transceiver 1210 and the display module 1220.

The controller 1230 may be understood to perform all operations performed by the peripheral device.

Although FIG. 12 illustrates the transceiver 1210 and the controller 1230 as separate components, the transceiver 1210 and the controller 1230 may be implemented as one component.

It is noted that the view of the configuration of the system, illustration of a topology, illustration of a protocol stack, diagram for signal flow, and the view of the configuration of the devices in FIGS. 1 to 12, do not limit the scope of the present invention. That is, all configurations or steps illustrated in FIGS. 1 to 12 should not be interpreted as essentially structural elements for carrying out the present invention, and variations and modifications of the present invention may be implemented without departing from the scope of the present invention.

The above described operations may be implemented by providing a memory device storing a corresponding program code to a dockee device of a communication system, a WDC device, a peripheral device, or a specific structural element of the terminal. That is, the dockee device, the WDC device, the peripheral device, or the controller of the terminal carries out the above described operations by reading and executing the program code stored in the memory device by means of a processor or a Central Processing Unit (CPU).

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an Application Specific Integrated Circuit (ASIC).

An embodiment of the present disclosure can implement a Wi-Fi display in a docking scenario by operating a 2-hop protocol as a 1-hop.

Since discovery information of a peripheral device according to an embodiment of the present invention can be transmitted at a time during a docking discovery or a pilot protocol, an efficient discovery is possible.

A source device according to an embodiment of the present invention has an effect of directly transmitting data to a sink device in a docking scenario, so that a data delay problem can be solved.

Since a source device according to an embodiment of the present invention informs a docking center device of a data transmission mode, an error of forming an incorrect connection between the source device and the docking center device can be eliminated.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of supporting data transmission by a wireless docking center, the method comprising:
   establishing a first link between a proxy source module included in the wireless docking center and a peripheral device;
   establishing a second link between a proxy sink module included in the wireless docking center and a dockee device;
   transmitting, from the proxy sink module to the dockee device, an internet protocol (IP) address and a medium access control (MAC) address of the pipheal device linked with the proxy source module; and
   transmitting, from the proxy source module to the peripheral device through the first link, the data received from the dockee device to the proxy sink module through the second link, wherein the proxy source module is a source for transmitting the data to the peripheral device and the proxy sink module is a sink for receiving the data from the dockee device, and wherein the data has a destination address that is set based on the IP address and the MAC address of the peripheral device.

2. The method of claim 1, wherein the IP address, the MAC address, and the port number of the peripheral device is obtained through a discovery procedure of the peripheral device or a capability exchange procedure with the peripheral device.

3. The method of claim 1, wherein the IP address, the MAC address, and the port number of the peripheral device is transmitted to the dockee device during a peripheral discovery procedure.

4. The method of claim 1, further comprising:
receiving a universal plug and play (UPnP) message indicating a miracast relay connection between the dockee device and the peripheral device from the dockee device.

5. The method of claim 1, further comprising:
transferring a message from the second link to the first link,
wherein the message includes at least one of an IP address, a MAC address, and a port number of the wireless docking center as a destination address.

6. The method of claim 1, further comprising:
forwarding the data to the peripheral device through an RTP connection.

7. The method of claim 1, wherein the peripheral device is a miracast sink device supporting a Wi-Fi display.

8. A method of transmitting data by a dockee device configured to transmit the data and dock to a wireless docking center, the method comprising:
establishing a first link with a proxy sink module included in the wireless docking center having established a second link between a proxy source module included in the wireless docking center and a peripheral device;
receiving, from the proxy sink module, an internet protocol (IP) address and a medium access control (MAC) address of the peripheral device linked with the proxy source module;
generating the data with a destination address that is set based on the IP address and the MAC address of the peripheral device; and
transmitting the data to the proxy sink module included in the wireless docking center through the first link,
wherein the proxy source module is a source for transmitting the data to the peripheral device and the proxy sink module is a sink for receiving the data from the dockee device.

9. The method of claim 8, wherein the IP address, the MAC address, and the port number of the peripheral device is received during a peripheral discovery procedure.

10. The method of claim 8, further comprising:
transmitting a universal plug and play (UPnP) message indicating a miracast relay connection between the dockee device and the peripheral device to the wireless docking center.

11. The method of claim 8, further comprising:
transmitting a message to the wireless docking center through the first link,
wherein the message includes at least one of an IP address, a MAC address, and a port number of the wireless docking center as a destination address.

12. A wireless docking center device supporting data transmission, the wireless docking center device comprising:
a proxy source module configured to establish a first link with a peripheral device;
a proxy sink module configured to establish a second link with a dockee device; and
a controller configured to control:
to transmit, from the proxy sink module to the dockee device, an internet protocol (IP) address and a medium access control (MAC) address of the peripheral device linked with the proxy source module, and
to transmit, from the proxy source module, to the peripheral device through the first link, the data received from the dockee device to the proxy sink module through the second link,
wherein the proxy source module is a source for transmitting the data to the peripheral device and the proxy sink module is a sink for receiving the data from the dockee device, and
wherein the data has a destination address that is set based on the IP address and the MAC address of the peripheral device.

13. The wireless docking center device of claim 12, wherein the controller is further configured to obtain the IP address, the MAC address, and the port number of the peripheral device during a discovery procedure of the peripheral device or a capability exchange procedure with the peripheral device.

14. The wireless docking center device of claim 12, wherein the controller is further configured to control transmission of the IP address, the MAC address, and the port number of the peripheral device to the dockee device during a peripheral discovery procedure.

15. The wireless docking center device of claim 12, wherein the controller is further configured to control reception of a unviersal plug and play (UPnP) message indicating a miracast relay connection between the dockee device and the peripheral device from the dockee device.

16. The wireless docking center device of claim 12, wherein:
the controller is further configured to transfer a message from the second link to the first link, and
the message includes at least one of an IP address, a MAC address, and a port number of the wireless docking center as a destination address.

17. The wireless docking center device of claim 12, wherein the controller is further configured to control forwarding of the data to the peripheral device through an RTP connection.

18. The wireless docking center device of claim 12, wherein the peripheral device is a miracast sink device supporting a Wi-Fi display.

19. A dockee device configured to transmit data and dock to a wireless docking center, the dockee device comprising:
a controller configured to control:
to establish a first link with a proxy sink module included in the wireless docking center having established a second link between a proxy source module included in the wireless docking center and a peripheral device,
to receive, from the proxy sink module, an internet protocol (IP) address and a medium access control (MAC) address of the peripheral device linked with the proxy source module, and to generate the data with a destination address that is set based on the IP address and the MAC address of the peripheral device; and a transceiver configured to transmit the data to the proxy sink module included in the wireless docking center through the first link, wherein the proxy source module is a source for transmitting the data to the peripheral device and the proxy sink module is a sink for receiving the data from the dockee device.

20. The dockee device of claim 19, wherein the controller is further configured to control reception of the IP address, the MAC address, and the port number of the peripheral device during a peripheral discovery procedure.

21. The dockee device of claim 19, wherein the controller is further configured to control transmisison of a universal plug and play (UPnP) message indicating a miracast relay connection between the dockee device and the peripheral device to the wireless docking center.

22. The dockee device of claim 19, wherein:
the transciever is further configured to transmit a message to the wireless docking center through the first link, and
the message includes at least one of an IP address, a MAC address, and a port number of the wireless docking center as a destination address.

23. A method of receiving data by a peripheral device configured to receive the data and dock to a wireless docking center, the method comprising:
establishing a first link with a proxy source module included in the wireless docking center having established a second link between a proxy sink module included in the wireless docking center and a dockee device; and receiving the data from the proxy source module included in the wireless docking center through the first link, wherein the proxy source module is a source for transmitting the data to the peripheral device and the proxy sink module is a sink for receiving the data from the dockee device, and wherein the data has a destination address that is set based on an internet protocol (IP) address and a medium access control (MAC) address of the peripheral device.

24. A peripheral device configured to receive data and dock to a wireless docking center, the peripheral device comprising:
a controller configured to establish a first link with a proxy source module included in the wireless docking center having established a second link between a proxy sink module included in the wireless docking center and a dockee device, and a transceiver configured to receive the data from the proxy source module included in the wireless docking center through the first link, wherein the proxy source module is a source for transmitting the data to the peripheral device and the proxy sink module is a sink for receiving the data from the dockee device, and wherein the data has a destination address that is set based on an internet protocol (IP) address and a medium access control (MAC) address of the peripheral device.

* * * * *